United States Patent
Kamigaito

(10) Patent No.: US 9,561,618 B2
(45) Date of Patent: Feb. 7, 2017

(54) FORM-FILL-SEAL MACHINE

(75) Inventor: Satoru Kamigaito, Omihachiman (JP)

(73) Assignee: ISHIDA CO., LTD., Kyoto (JP)

( * ) Notice: Subject to any disclaimer, the term of this patent is extended or adjusted under 35 U.S.C. 154(b) by 626 days.

(21) Appl. No.: 13/469,802

(22) Filed: May 11, 2012

(65) Prior Publication Data
US 2012/0285127 A1    Nov. 15, 2012

(30) Foreign Application Priority Data
May 11, 2011    (JP) .................................. 2011-106076

(51) Int. Cl.
*B65B 51/26*    (2006.01)
*B29C 65/08*    (2006.01)
(Continued)

(52) U.S. Cl.
CPC ........... *B29C 65/08* (2013.01); *B29C 65/7888* (2013.01); *B29C 65/7891* (2013.01);
(Continued)

(58) Field of Classification Search
CPC .... B65B 51/26; B65B 51/225; B29C 66/9592; B29C 66/9516; B29C 66/92445; B29C 66/49; B29C 65/08; B29C 65/7832; B29C 66/849; B29C 66/4312; B29C 66/4322; B29C 66/93441; B29C 66/9392; B29C 65/00; B29C 66/9241; B29C 66/1122; B29C 66/92921; Y10T 156/1013
(Continued)

(56) References Cited

U.S. PATENT DOCUMENTS 4,128,985 A * 12/1978 Simmons ........................ 53/51
4,274,244 A *  6/1981 Gilbert ........................... 53/451
(Continued)

FOREIGN PATENT DOCUMENTS

JP    S62-33065 B2    7/1987
JP    11-198233 A     7/1999
(Continued)

OTHER PUBLICATIONS

Patent Examination Report No. 2 of the corresponding Australian application No. 2012202772, dated Apr. 23, 2015.
(Continued)

*Primary Examiner* — Robert Long
*Assistant Examiner* — Xavier A Madison
(74) *Attorney, Agent, or Firm* — Global IP Counselors, LLP

(57) ABSTRACT

A form-fill-seal machine 100 has a pull-down belt mechanism 23, a vertical sealing mechanism 2, and a controller 29. The pull-down belt mechanism conveys a cylindrical film Fm. The vertical sealing mechanism applies pressure and ultrasonic oscillation to the cylindrical film which is conveyed by the pull-down belt mechanism, and seals the cylindrical film. The controller controls the pull-down belt mechanism, and the pressure and the amplitude of the ultrasonic oscillation applied to the cylindrical film by the vertical sealing mechanism. The controller applies pressure and ultrasonic oscillation to the cylindrical film immediately before reaching a first point in time when the cylindrical film begins to be conveyed. The controller changes at least one of the pressure and the amplitude of the ultrasonic oscillation applied to the film according to the speed of the film in a time period after reaching the first point in time.

4 Claims, 7 Drawing Sheets

(51) Int. Cl.
- *B29C 65/78* (2006.01)
- *B29C 65/00* (2006.01)
- *B65B 51/22* (2006.01)
- *B65B 9/20* (2012.01)
- *B65B 9/213* (2012.01)

(52) U.S. Cl.
CPC ...... *B29C 65/7894* (2013.01); *B29C 66/1122* (2013.01); *B29C 66/4312* (2013.01); *B29C 66/4322* (2013.01); *B29C 66/49* (2013.01); *B29C 66/73921* (2013.01); *B29C 66/81431* (2013.01); *B29C 66/8242* (2013.01); *B29C 66/836* (2013.01); *B29C 66/83543* (2013.01); *B29C 66/849* (2013.01); *B29C 66/92445* (2013.01); *B29C 66/92921* (2013.01); *B29C 66/9392* (2013.01); *B29C 66/93441* (2013.01); *B29C 66/9516* (2013.01); *B29C 66/9592* (2013.01); *B65B 9/2028* (2013.01); *B65B 9/213* (2013.01); *B65B 51/225* (2013.01); *B29C 65/7873* (2013.01); *B29C 66/83411* (2013.01)

(58) Field of Classification Search
USPC .............................................. 53/548, 64, 545
See application file for complete search history.

(56) References Cited

U.S. PATENT DOCUMENTS

| | | | | |
|---|---|---|---|---|
| 4,373,982 | A | * | 2/1983 | Kreager ................. B29C 66/49 |
| | | | | 156/203 |
| 4,759,170 | A | * | 7/1988 | Sawa et al. ..................... 53/551 |
| 5,658,408 | A | | 8/1997 | Frantz et al. |
| 2007/0257087 | A1 | | 11/2007 | Klinstein et al. |

FOREIGN PATENT DOCUMENTS

| | | |
|---|---|---|
| JP | 2001-233309 A | 8/2001 |
| JP | 2011-031907 A | 2/2011 |

OTHER PUBLICATIONS

Patent Examination Report No. 1 of the corresponding Australian Patent Application No. 2012202772, dated dated Oct. 21, 2014.

Office Action of the corresponding Japanese Application No. 2011-106076, dated Mar. 17, 2015.

Information Statement by Third Party of the corresponding Japanese Application No. 2011-106076, dated Jun. 17, 2015.

* cited by examiner

FORM-FILL-SEAL MACHINE

TECHNICAL FIELD

The present invention relates to a form-fill-seal machine.

BACKGROUND ART

Conventionally, a form-fill-seal machine having an ultrasonic sealing device, such as that disclosed in Patent Document 1 (Japanese Unexamined Patent Application Publication No. 2001-233309), is used as a form-fill-seal machine for shaping a bag from a film-shaped packaging material and filling the bag with packaged contents such as a snack food or the like. After applying fine ultrasonic oscillation to the thermoplastic packaging material and melting the material, the ultrasonic sealing device applies pressure to and seals the packaging material.

SUMMARY OF THE INVENTION

However, in an ultrasonic sealing device having a mechanism wherein the packaging material conveyance speed changes when the packaging material is being sealed, the packaging material cannot be stably sealed if the energy applied to the packaging material during sealing is not properly controlled.

An object of the present invention is to provide a form-fill-seal machine capable of stably sealing a packaging material.

A form-fill-seal machine according to the present invention comprises a conveyor, a sealing unit, and a controller. The conveyor conveys a cylindrical film. The sealing unit applies pressure and ultrasonic oscillation to the film conveyed by the conveyor, and seals the film. The controller controls a speed of the film conveyed by the conveyor, and controls at least one of the pressure and an amplitude of the ultrasonic oscillation applied to the film by the sealing unit. The controller applies the pressure and the ultrasonic oscillation to the film in a time period immediately prior to a first point at which the conveyor begins to convey the film. The controller changes, depending on the speed of the film, at least one of the pressure and the amplitude of the ultrasonic oscillation applied to the film in a time period after the first point.

The form-fill-seal machine according to the present invention conveys the film constituting the packaging material while applying pressure and ultrasonic oscillation thereto, and seals the film. This form-fill-seal machine applies pressure and ultrasonic oscillation to the film in a preparatory time period immediately before the film begins to be conveyed. By applying energy to the film in advance in the form of pressure and ultrasonic oscillation before the film is conveyed, the film can be readily melted during the main operation time period during which the film is sealed. The form-fill-seal machine according to the present invention is therefore capable of stably sealing a packaging material.

In the form-fill-seal machine according to the present invention, the controller preferably controls the conveyor and the sealing unit so that at least one of the pressure and the amplitude of the ultrasonic oscillation applied to the film increases as the speed of the film increases in a time period from the first point to a second point at which the speed of the film becomes constant. In this aspect, the pressure and/or the amplitude of the ultrasonic oscillation being applied to the film increases as the speed of the film increases during the time period from the point in time when the film starts to be conveyed to the point in time when the film conveyance speed increases and becomes constant.

In the form-fill-seal machine according to the present invention, the controller also preferably controls the conveyor and the sealing unit so that at least one of the pressure and the amplitude of the ultrasonic oscillation applied to the film begins to decrease after the second point and immediately prior to a third point at which the speed of the film begins to decrease. In this aspect, the pressure and/or the amplitude of the ultrasonic oscillation being applied to the film begins to decrease before the point in time when the film conveyance speed begins to decrease. It is thereby possible to prevent more ultrasonic oscillation energy than necessary from being applied to the film during the time period when the film conveyance speed decreases, and to prevent the film from melting excessively.

In the form-fill-seal machine according to the present invention, the sealing unit has a horn, an anvil, and a pressurizing unit for applying the pressure to the film via the horn and the anvil; and the controller preferably controls the conveyor and the sealing unit so that the pressurizing unit applies the pressure to the film in a time period immediately prior to the first point. In this aspect, the pressure is applied to the film sandwiched between the horn and the anvil during a preparatory time period immediately before the film conveyance begins.

Advantageous Effects of Invention

The form-fill-seal machine according to the present invention is capable of stably sealing a packaging material.

DESCRIPTION OF EMBODIMENTS

Configuration of the Form-Fill-Seal Machine

Figure 1:
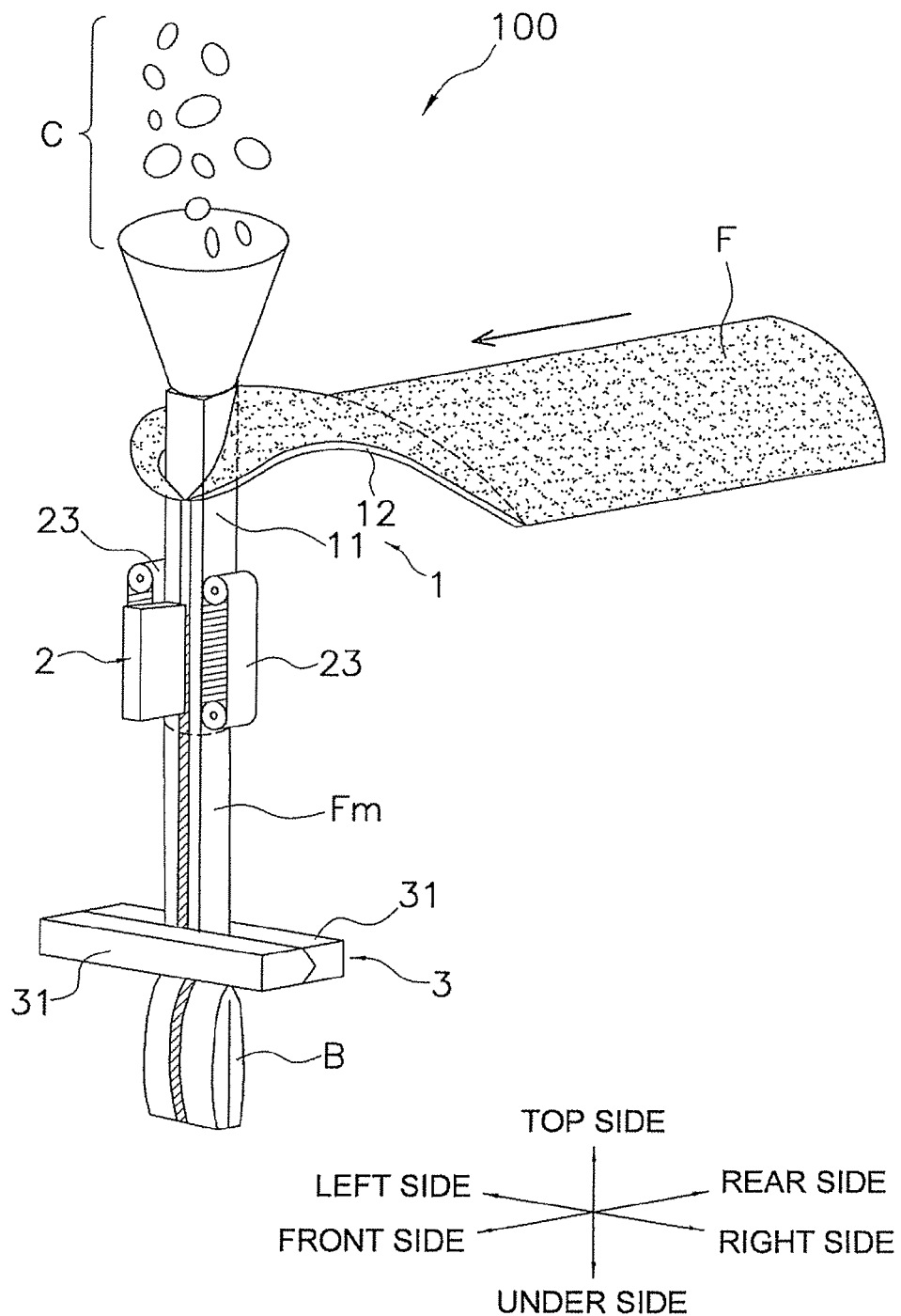
FIG. 1 is an outline of the configuration of a form-fill-seal machine according to an embodiment of the present invention.

FIG. 1 shows an outline of the configuration of a form-fill-seal machine 100 according to an embodiment of the present invention. The form-fill-seal machine 100 is a machine for covering packaged contents such as potato chips or the like with a film formed into a cylindrical shape, sealing the film in the vertical direction and the horizontal direction, and manufacturing a bag inside of which are packaged contents.

As shown in FIG. 1, the form-fill-seal machine 100 primarily has a film supply unit (not shown) for supplying a thermoplastic film F constituting the packaging material, a shaping mechanism 1 for shaping the sheet-shaped film F being sent from the film supply unit into a cylindrical shape, a vertical sealing mechanism 2 for sealing overlapping portions of the film F shaped into a cylindrical shape (hereafter, "cylindrical film Fm") in the vertical direction, and a horizontal sealing mechanism 3 for sealing the cylindrical film Fm in the horizontal direction.

Shaping Mechanism

The shaping mechanism 1 has a tube 11 and a former 12. The tube 11 is a cylinder-shaped member having openings at upper and lower ends thereof. Potato chips C constituting the packaged contents are introduced into the upper end opening of the tube 11. The former 12 is disposed so as to surround an upper end of the tube 11. The former 12 has a shape such that the sheet-shaped film F sent from the film supply unit is shaped into the cylindrical film Fm upon passing between the former 12 and the upper end of the tube 11. The cylindrical film Fm has overlapping portions where two ends of the film F in the horizontal direction overlap each other. The tube 11 and the former 12 can be changed out according to the size of the bag being manufactured.

As shown in FIG. 1, a pull-down belt mechanism 23 (also referred to hereinbelow as a conveyor) is provided at the left and right sides of the tube 11 as seen from the front of the form-fill-seal machine 100. The pull-down belt mechanism 23 applies suction to the cylindrical film Fm wrapped around the tube 11 and conveys the film downward.

Vertical Sealing Mechanism

Figure 2:
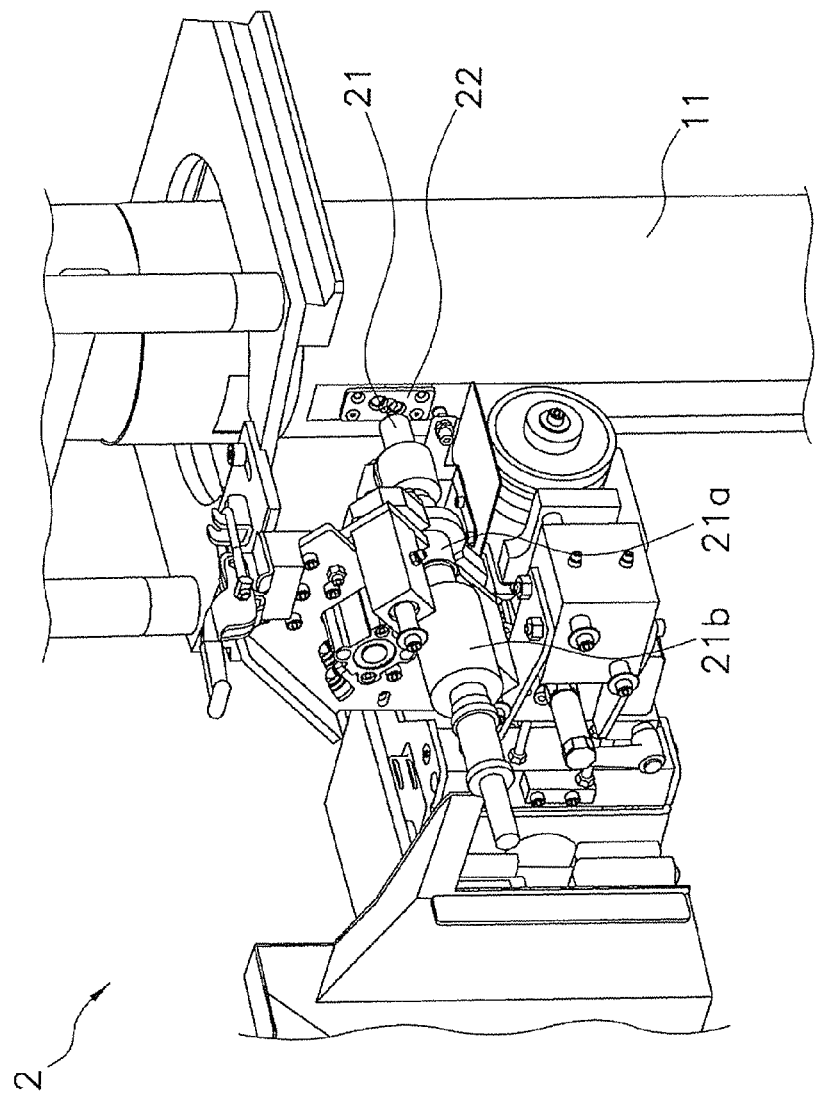
FIG. 2 is an external view of a vertical sealing mechanism of a form-fill-seal machine according to an embodiment of the present invention.

The vertical sealing mechanism 2 is a mechanism for applying ultrasonic oscillation and pressure to the overlapping portions of the cylindrical film Fm being conveyed downward by the pull-down belt mechanism 23 and sealing the same in the vertical direction. FIG. 2 shows an external view of the vertical sealing mechanism 2. The vertical sealing mechanism 2 has a horn 21 and an anvil 22 that are positioned such that the overlapping portion of the cylindrical film Fm is conveyed between the horn 21 and the anvil 22. The horn 21 is coupled to an ultrasonic transducer 21a and an air cylinder 21b. The anvil 22 is attached to an outer peripheral surface of the tube 11, and is disposed in opposition to an apical surface of the horn 21. The horn 21 generates ultrasonic oscillation on the basis of ultrasonic waves emitted by the ultrasonic transducer 21a. The horn 21 advances and withdraws with respect to the anvil 22 on the basis of the air pressure within the air cylinder 21b. The horn 21 heats and melts the cylindrical film Fm using ultrasonic oscillation when the cylindrical film Fm is sandwiched between the horn 21 and the anvil 22, and presses the cylindrical film Fm against the anvil 22 to apply the pressure thereto. The overlapping portions of the cylindrical film Fm are thereby melted and sealed.

Figure 3:
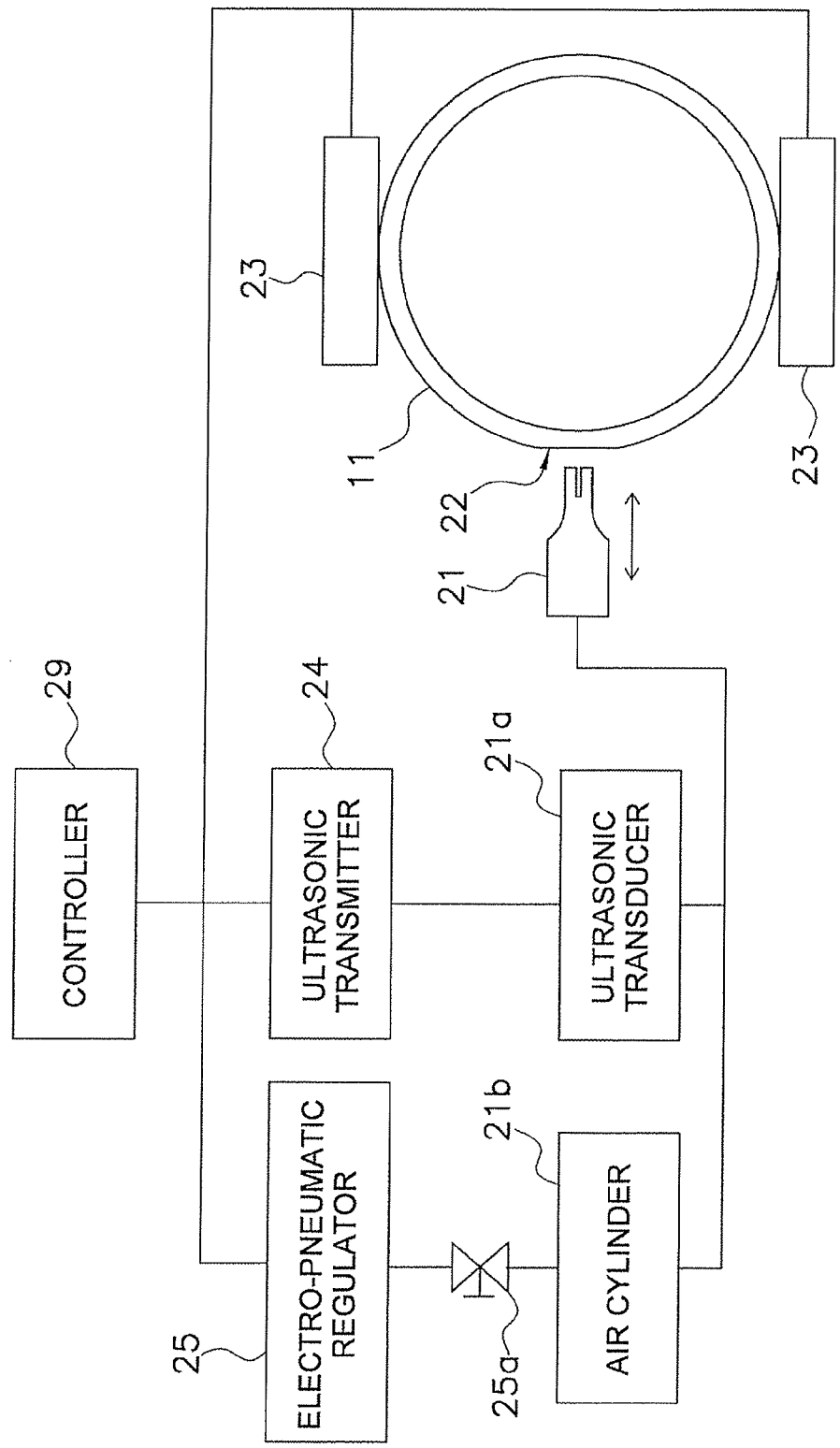
FIG. 3 is a block diagram of a vertical sealing mechanism according to an embodiment of the present invention.

FIG. 3 is a block diagram of the vertical sealing mechanism 2. The ultrasonic transducer 21a is connected to an ultrasonic transmitter 24, and the air cylinder 21b is connected to an electro-pneumatic regulator 25. The ultrasonic transmitter 24 is a device for controlling the amplitude of the ultrasonic oscillation generated by the horn 21 due to the ultrasonic transducer 21a. The electro-pneumatic regulator 25 is a device for sending air supplied from an air source (not shown) into the air cylinder 21b via an electromagnetic valve 25a, and controlling the air pressure within the air cylinder 21b. In other words, the electro-pneumatic regulator 25 controls the pressure applied to the overlapping portion of the cylindrical film Fm by the horn 21 and the anvil 22. A controller 29 is connected to the ultrasonic transducer 21a, the ultrasonic transmitter 24, the air cylinder 21b, the pull-down belt mechanism 23, the electro-pneumatic regulator 25 and the electromagnetic valve 25a. The controller 29 is configured to control and sequence operation of each of these elements in a manner described further below. More specifically, the controller 29 is a computer that controls the operation of the pull-down belt mechanism 23, ultrasonic transmitter 24, and electro-pneumatic regulator 25.

Horizontal Sealing Mechanism

The horizontal sealing mechanism 3 is disposed beneath the shaping mechanism 1 and the vertical sealing mechanism 2. The horizontal sealing mechanism 3 has a pair of sealing jaws 31 with a heater incorporated therein. The pair of sealing jaws 31 are respectively disposed to the front and rear sides of the cylindrical film Fm as seen from the front of the form-fill-seal machine 100. Each of the pair of sealing jaws 31 revolves so as to describe roughly D-shaped tracks (not shown) that are symmetrical in the front and the rear. In other words, one of the sealing jaws 31 is located on a front side of the cylindrical film Fm and the other of the sealing jaws 31 is located on a rear side of the cylindrical film Fm. While revolving, the pair of sealing jaws 31 press against one another, sandwiching the cylindrical film Fm therebetween, and apply pressure and heat to portions of the cylindrical film Fm that become the upper and lower ends of the bag, sealing them.

A conventional cutter (not shown) is incorporated within one of the sealing jaws 31. The cutter cuts off a bag B from the following cylindrical film Fm at a position central with respect to the height direction of the horizontal seal portion formed by the sealing jaws 31. Operation of the sealing jaws 31 is also controlled by the controller 29.

(2) Operation of the Form-Fill-Seal Machine

The potato chips C constituting the packaged contents are weighed to a predetermined amount by a scale (not shown) provided above the form-fill-seal machine 100, and introduced into the tube 11 of the shaping mechanism 1. The film F is sent in a sheet from the film supply unit, and is shaped into a cylindrical shape by the shaping mechanism 1. The shaped cylindrical film Fm is sealed in the vertical direction by the vertical sealing mechanism 2 while being conveyed downward by the pull-down belt mechanism 23.

The horn 21 of the vertical sealing mechanism 2 generates ultrasonic oscillation on the basis of the ultrasonic oscillation emitted by the ultrasonic transducer 21a. The overlapping portions of the cylindrical film Fm sandwiched between the horn 21 and the anvil 22 are subjected to the energy of the ultrasonic oscillation from the horn 21, are heated, and melt. The molten overlapping portions of the cylindrical film Fm are sandwiched between the horn 21 and the anvil 22, and pressure is applied thereto. The overlapping portions of the cylindrical film Fm are thereby melted and sealed. During the process of sealing the cylindrical film Fm in the vertical direction, the controller 29 controls the speed of the cylindrical film Fm being conveyed by the pull-down belt mechanism 23, the amplitude of the ultrasonic oscillation emitted by the ultrasonic transducer 21a, and the air pressure within the air cylinder 21b.

After the overlapping portion of the cylindrical film Fm is sealed in the vertical direction by the vertical sealing mechanism 2, the cylindrical film Fm is sealed by the horizontal sealing mechanism 3 in the horizontal direction at portions becoming the upper and lower ends of the bag B. First, the portion becoming the lower end of the bag B is horizontally sealed, and the potato chips C within the tube 11 are introduced into the cylindrical film Fm. Next, the portion becoming the upper end of the bag B is horizontally sealed, and the cutter incorporated into the sealing jaws 31 cuts the horizontal seal portion at a position corresponding to the center of the height direction thereof. The bag B is thereby cut off from the following cylindrical film Fm.

(3) Control of the Vertical Sealing Mechanism

Figure 4:
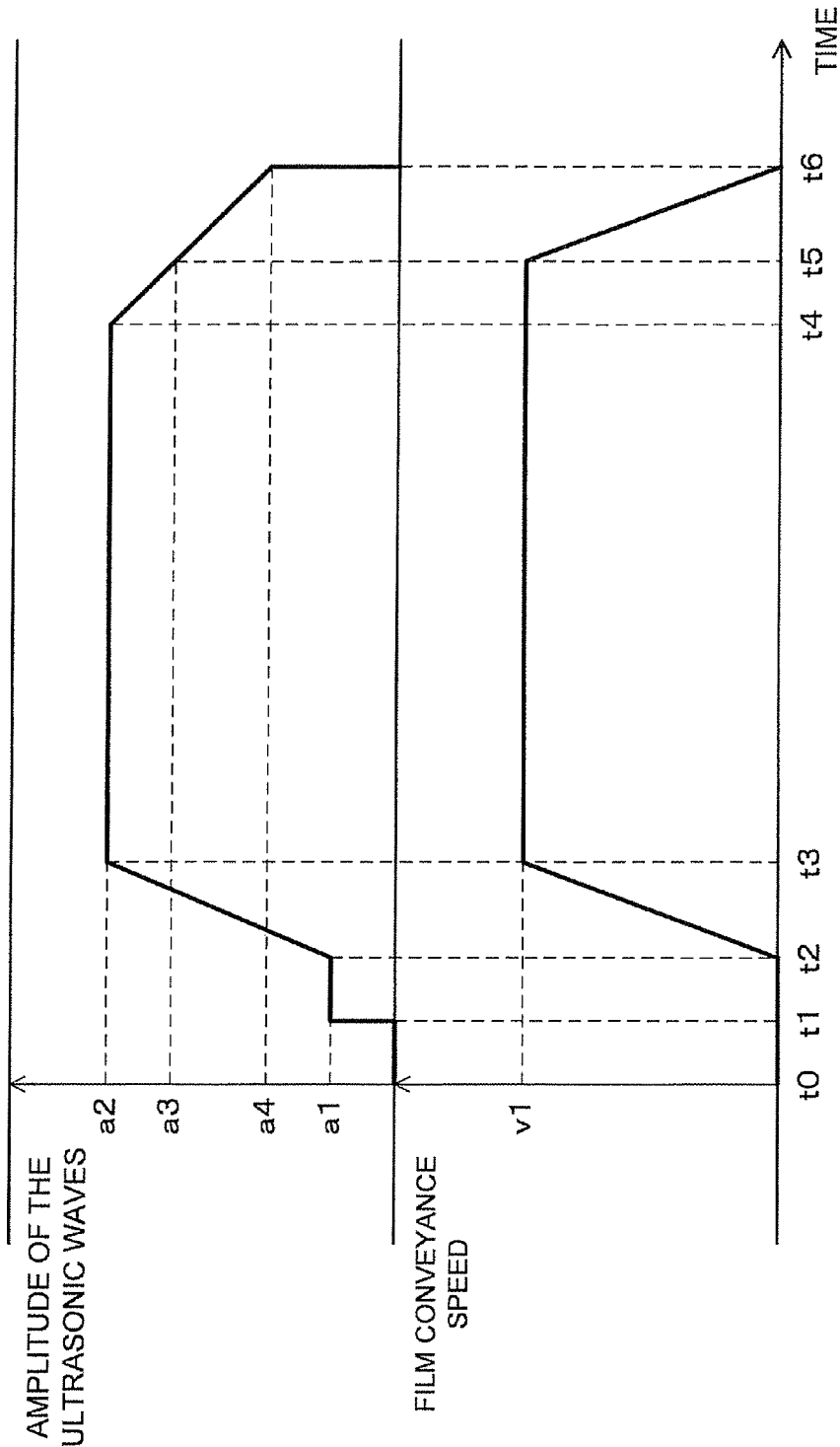
FIG. 4 is a time chart according to an embodiment of the present invention.

The operation of the controller 29 in the form-fill-seal machine 100 according to an embodiment of the present invention when the vertical sealing mechanism 2 seals the cylindrical film Fm using ultrasonic waves is described below with reference to the time chart of FIG. 4. Specifically, the controller 29 is a sequencing device that operates each of the components of the form-fill-seal machine 100 in a predetermined timing order or timing sequence with operation of some elements overlapping with others such that several elements operate simultaneously but can also be operated at different times from one another, as is explained below. FIG. 4 illustrates changes over time in the conveyance speed of the cylindrical film Fm and the amplitude of the ultrasonic oscillation applied to the cylindrical film Fm at times t0 through t6 from when the vertical sealing mechanism 2 begins conveying the cylindrical film Fm, to when the cylindrical film Fm is sealed, to when the cylindrical film Fm stops being conveyed. In FIG. 4, "film conveyance speed" illustrates the speed of the cylindrical film Fm being conveyed downward by the pull-down belt mechanism 23, and "amplitude of the ultrasonic waves" illustrates the amplitude of the ultrasonic oscillation applied by the ultrasonic transmitter 24 to the cylindrical film Fm. The form-fill-seal machine 100 repeats the cycle of times t0 through t6 shown in FIG. 4 in a process of continuously manufacturing bags B. Throughout times t0 through t6, a predetermined pressure is applied to the cylindrical film Fm on the basis of the air pressure within the air cylinder 21b. Here follows a description of the control performed by the controller 29 at each of times t0 through t6.

At time t0, the cylindrical film Fm is static, not being conveyed, and is sandwiched between the horn 21 and the anvil 22. At time t0, ultrasonic oscillation is not applied to the cylindrical film Fm.

At time t1, the cylindrical film Fm is static, not being conveyed, and is sandwiched between the horn 21 and the anvil 22. At time t1, ultrasonic oscillation begins to be applied to the cylindrical film Fm. In the time period from time t0 to time t1, the film conveyance speed and the amplitude of the ultrasonic waves are both zero.

At time t2 (also referred to as a first point in time), the cylindrical film Fm begins to be conveyed, and the amplitude of the ultrasonic oscillation applied to the cylindrical film Fm begins to increase. In the time period from time t1 to time t2 (also referred to as a first time period), the film conveyance speed is zero, and the amplitude of the ultrasonic waves is a constant value a1.

At time t3, the speed of the cylindrical film Fm becomes constant, and the amplitude of the ultrasonic oscillation applied to the cylindrical film Fm becomes constant. In the time period from time t2 until time t3 (also referred to as a second time period), the film conveyance speed gradually increases from zero to v1, and the amplitude of the ultrasonic waves gradually increases from a1 to a2.

At time t4, the amplitude of the ultrasonic oscillation applied to the cylindrical film Fm begins to decrease. In the time period from time t3 to time t4, the film conveyance speed is a constant value v1, and the amplitude of the ultrasonic waves is a constant value a2.

At time t5, the conveyance speed of the cylindrical film Fm begins to decrease. In the time period from time t4 to time t5, the film conveyance speed is a constant value v1, and the amplitude of the ultrasonic waves gradually decreases from a2 to a3.

At time t6, the conveyance speed of the cylindrical film Fm becomes zero, and the amplitude of the ultrasonic oscillation applied to the cylindrical film Fm becomes zero. In the time period from time t5 to time t6, the film conveyance speed gradually decreases from v1 to zero, and the amplitude of the ultrasonic waves gradually decreases from a3 to a4 before becoming zero.

(4) Characteristics of the Form-Fill-Seal Machine (4-1)

During the process of sealing the cylindrical film Fm using the vertical sealing mechanism 2 of the form-fill-seal machine 100 according to the present embodiment, ultrasonic oscillation of amplitude a1 is applied to the cylindrical film Fm in the preparatory time period from t1 to t2 immediately before time t2, when the cylindrical film Fm begins to be conveyed. In other words, in the embodiment, ultrasonic oscillation energy is applied to the cylindrical film Fm before the main operation time period from t2 to t6 in which the cylindrical film Fm is subjected to ultrasonic oscillation while being conveyed, sealing the cylindrical film Fm. The cylindrical film Fm is thereby readily melted during the main operation time period from t2 to t6. The form-fill-seal machine 100 according to the embodiment is thus capable of stably sealing the cylindrical film Fm.

(4-2)

During the process of sealing the cylindrical film Fm using the vertical sealing mechanism 2 of the form-fill-seal machine 100 according to the embodiment, the amplitude of the ultrasonic oscillation being applied to the cylindrical film Fm begins to decrease at time t4 prior to time t5, when the speed of the cylindrical film Fm begins to decrease. If it is hypothesized that the amplitude of the ultrasonic oscillation being applied to the cylindrical film Fm begins to decrease concurrently with time t5, when the speed of the cylindrical film Fm begins to decrease (i.e., the amplitude of the ultrasonic oscillation applied to the cylindrical film Fm does not decrease until time t5), there is a risk of more ultrasonic oscillation energy than necessary being applied to the cylindrical film Fm during the time period from time t5 to time t6, when the speed of the cylindrical film Fm decreases. There is also a risk of the physical properties of the horn 21 changing due to a rise in the temperature of the horn 21 based on the energy of the ultrasonic oscillation, thereby increasing the amplitude of the ultrasonic oscillation applied to the cylindrical film Fm, and applying more ultrasonic oscillation energy to the cylindrical film Fm than necessary.

Because the amplitude of the ultrasonic oscillation applied to the cylindrical film Fm in the form-fill-seal machine 100 according to the embodiment at time t5, when the speed of the cylindrical film Fm begins to decrease, decreases from a2 to a3, it is possible to prevent the cylindrical film Fm from excessively melting due to the ultrasonic oscillation energy. The form-fill-seal machine 100 according to the embodiment is thus capable of stably sealing the cylindrical film Fm.

(4-3)

In the form-fill-seal machine 100 according to the embodiment, ultrasonic oscillation having an amplitude corresponding to the speed of the cylindrical film Fm is applied to the cylindrical film Fm. In other words, the controller 29 properly controls the energy applied to the cylindrical film Fm during the process of sealing the cylindrical film Fm using the vertical sealing mechanism 2. The form-fill-seal machine 100 according to the embodiment is thus capable of stably sealing the cylindrical film Fm.

(5) Modification Examples

An embodiment of the invention is described above, but various modifications within the spirit of the present invention may be made to the specific configuration of the invention. Next, a modification example capable of application to the embodiment will be described.

(5-1) Modification Example A

Figure 5:
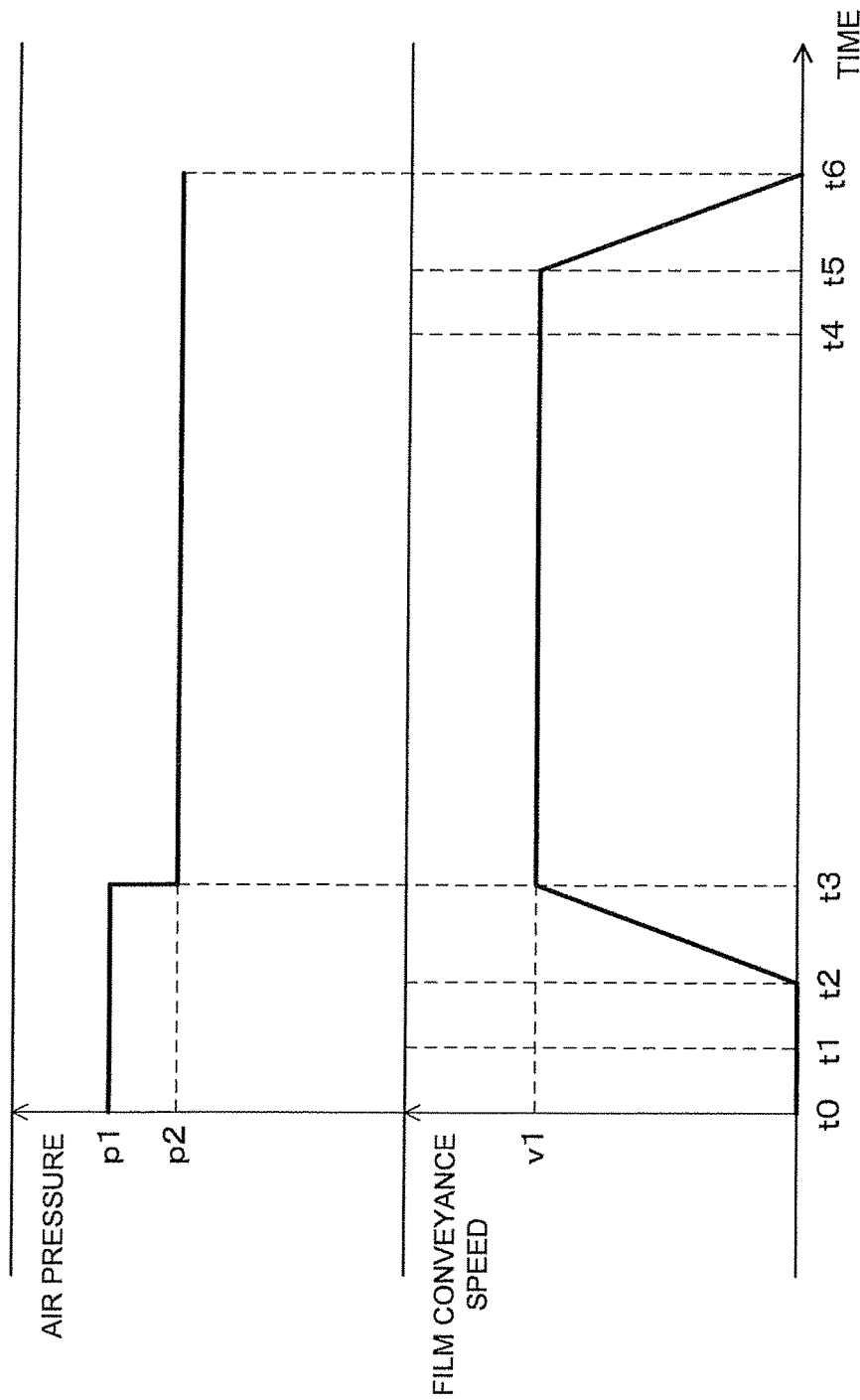
FIG. 5 is a time chart according to a modification example A of the present invention.

As shown in FIG. 4, the controller 29 of the form-fill-seal machine 100 according to the embodiment performs a control such that ultrasonic oscillation having an amplitude corresponding to the speed of the cylindrical film Fm is applied to the cylindrical film Fm, but the controller 29 may also perform a control such that pressure corresponding to the speed of the cylindrical film Fm is applied to the cylindrical film Fm in addition to the above control, as shown in FIG. 5. FIG. 5 shows changes over time in the conveyance speed of the cylindrical film Fm and the pressure applied to the cylindrical film Fm at times t0 through t6 from when the vertical sealing mechanism 2 begins conveying the cylindrical film Fm, to when the cylindrical film Fm is sealed, to when the cylindrical film Fm stops being conveyed. In FIG. 5, "air pressure" represents the air pressure within the air cylinder 21b, which is controlled by the electro-pneumatic regulator 25. The pressure applied to the cylindrical film Fm changes according to the air pressure within the air cylinder 21b.

In the present modification example, as shown in FIG. 5, the air pressure is at a constant value p1 during the time period from time t0 to time t3, when the cylindrical film Fm starts to be conveyed and the speed of the cylindrical film Fm becomes constant. Thereafter, during the time period from time t3 until time t6, when the cylindrical film Fm stops being conveyed, the air pressure stays at a constant value p2 that is lower than p1. In other words, in the present modification example, the pressure applied to the cylindrical film Fm decreases from time t3, when the amplitude of the ultrasonic oscillation applied to the cylindrical film Fm reaches maximum, onward. It is thereby possible to prevent more energy based on the air pressure within the air cylinder 21b than necessary from being applied to the cylindrical film Fm and the cylindrical film Fm from excessively melting from time t3, when the speed of the cylindrical film Fm becomes constant, onward. In this way, the form-fill-seal machine 100 according to the present modification example is capable of stably sealing the cylindrical film Fm.

(5-2) Modification Example B

As shown in FIG. 4, the controller 29 of the form-fill-seal machine 100 according to the embodiment performs a control such that ultrasonic oscillation having an amplitude corresponding to the speed of the cylindrical film Fm is applied to the cylindrical film Fm, but the controller 29 may also perform a control such that the power of the ultrasonic oscillation applied to the cylindrical film Fm is constant during the time period from t3 to t5, when the film conveyance speed is constant. It is thereby possible to prevent more ultrasonic oscillation energy than necessary from being applied to the cylindrical film Fm and the cylindrical film Fm from excessively melting during the time period from t3 to t5, when the speed of the cylindrical film Fm is constant. In this way, the form-fill-seal machine 100 according to the present modification example is capable of stably sealing the cylindrical film Fm.

(5-3) Modification Example C

In the form-fill-seal machine 100 according to the embodiment, the cycle of times t0 through t6 as shown in FIG. 4 and FIG. 5 is repeated during the process of continuously manufacturing the bags B, but the controller 29 may also control the ultrasonic transmitter 24 so that the amplitude of the ultrasonic oscillation applied to the cylindrical film Fm during the second and subsequent cycles is smaller than the amplitude of the ultrasonic oscillation applied to the cylindrical film Fm during the first cycle. Normally, at the point in time (time t0) when the second and subsequent cycles begin, part of the ultrasonic oscillation energy applied to the cylindrical film Fm during the first cycle remains in the cylindrical film Fm. In other words, by setting a low value for the amplitude of the ultrasonic oscillation (a1 and a2 in FIG. 4) applied to the cylindrical film Fm during the second and subsequent cycles in the present modification example, it is possible to prevent more ultrasonic oscillation energy than necessary from being applied to the cylindrical film Fm during the second and subsequent cycles, and the cylindrical film Fm from melting excessively. The form-fill-seal machine 100 according to the present modification example is thus capable of stably sealing the cylindrical film Fm.

(5-4) Modification Example D

Figure 6:
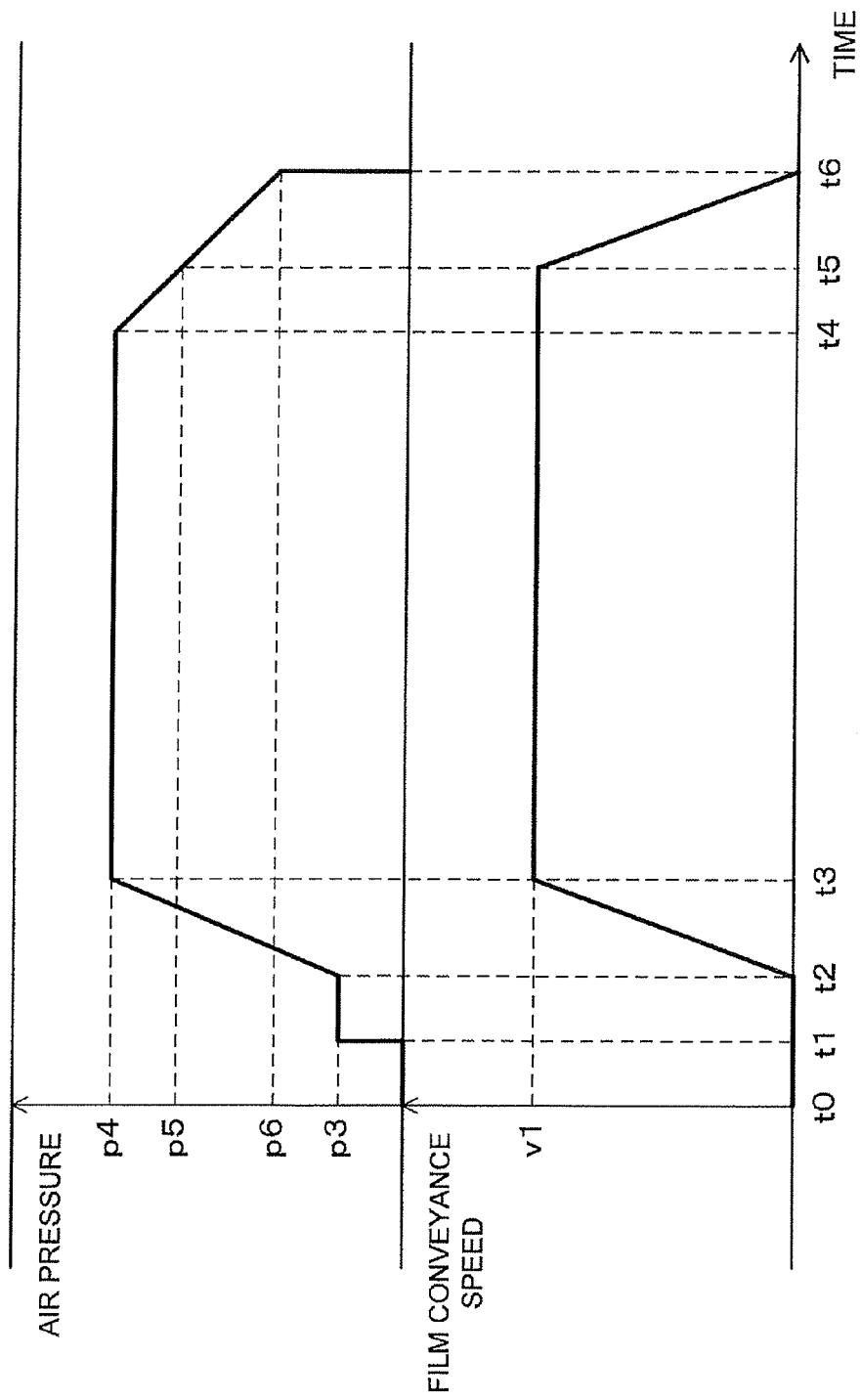
FIG. 6 is an air pressure time chart according to a modification example D of the present invention.

As shown in FIG. 4, the controller 29 of the form-fill-seal machine 100 according to the embodiment performs a control such that ultrasonic oscillation having an amplitude corresponding to the speed of the cylindrical film Fm is applied to the cylindrical film Fm, but the controller 29 may also perform a control such that pressure corresponding to the speed of the cylindrical film Fm is applied to the cylindrical film Fm, as shown in FIG. 6. FIG. 6 shows changes over time in the conveyance speed of the cylindrical film Fm and the pressure applied to the cylindrical film Fm at times t0 through t6 from when the vertical sealing mechanism 2 begins conveying the cylindrical film Fm, to when the cylindrical film Fm is sealed, to when the cylindrical film Fm stops being conveyed. In FIG. 6, as in FIG. 5, "air pressure" represents the air pressure within the air cylinder 21b, which is controlled by the electro-pneumatic regulator 25. The pressure applied to the cylindrical film Fm changes according to the air pressure within the air cylinder 21b. As shown in FIG. 6, the change over time in the pressure applied to the cylindrical film Fm during times t0 through t6 displays the same tendency as the change over time in the amplitude of the ultrasonic oscillation applied to the cylindrical film Fm during times t0 through t6 in the embodiment. Here follows a description of the control performed by the controller 29 at each of times t0 through t6.

At time t0, the cylindrical film Fm is static, not being conveyed, and is sandwiched between the horn 21 and the anvil 22. At time t0, air pressure is not applied to the cylindrical film Fm.

At time t1, the cylindrical film Fm is static, not being conveyed, and is sandwiched between the horn 21 and the anvil 22. At time t1, air pressure begins to be applied to the cylindrical film Fm. In the time period from time t0 to time t1, the film conveyance speed and the air pressure are both zero.

At time t2, the cylindrical film Fm begins to be conveyed, and the air pressure applied to the cylindrical film Fm begins to increase. In the time period from time t1 to time t2, the film conveyance speed is zero, and the air pressure is a constant value p3.

At time t3, the speed of the cylindrical film Fm becomes constant, and the air pressure applied to the cylindrical film Fm becomes constant. In the time period from time t2 until time t3, the film conveyance speed gradually increases from zero to v1, and the air pressure gradually increases from p3 to p4.

At time t4, the air pressure applied to the cylindrical film Fm begins to decrease. In the time period from time t3 to time t4, the film conveyance speed is a constant value v1, and the air pressure is a constant value p4.

At time t5, the conveyance speed of the cylindrical film Fm begins to decrease. In the time period from time t4 to time t5, the film conveyance speed is a constant value v1, and the air pressure gradually decreases from p4 to p5.

At time t6, the conveyance speed of the cylindrical film Fm becomes zero, and the air pressure applied to the cylindrical film Fm becomes zero. In the time period from time t5 to time t6, the film conveyance speed gradually decreases from v1 to zero, and the air pressure gradually decreases from p5 to p6 before becoming zero.

In the present modification example, as in the case of the control of the amplitude of the ultrasonic oscillation in the embodiment, the pressure applied to the cylindrical film Fm is controlled as shown in FIG. 6, thereby making it possible to prevent excessive energy based on the air pressure within the air cylinder 21b from being applied to the cylindrical film Fm, and the cylindrical film Fm from excessively melting. The form-fill-seal machine 100 according to the present modification example is thus capable of stably sealing the cylindrical film Fm.

Figure 7:
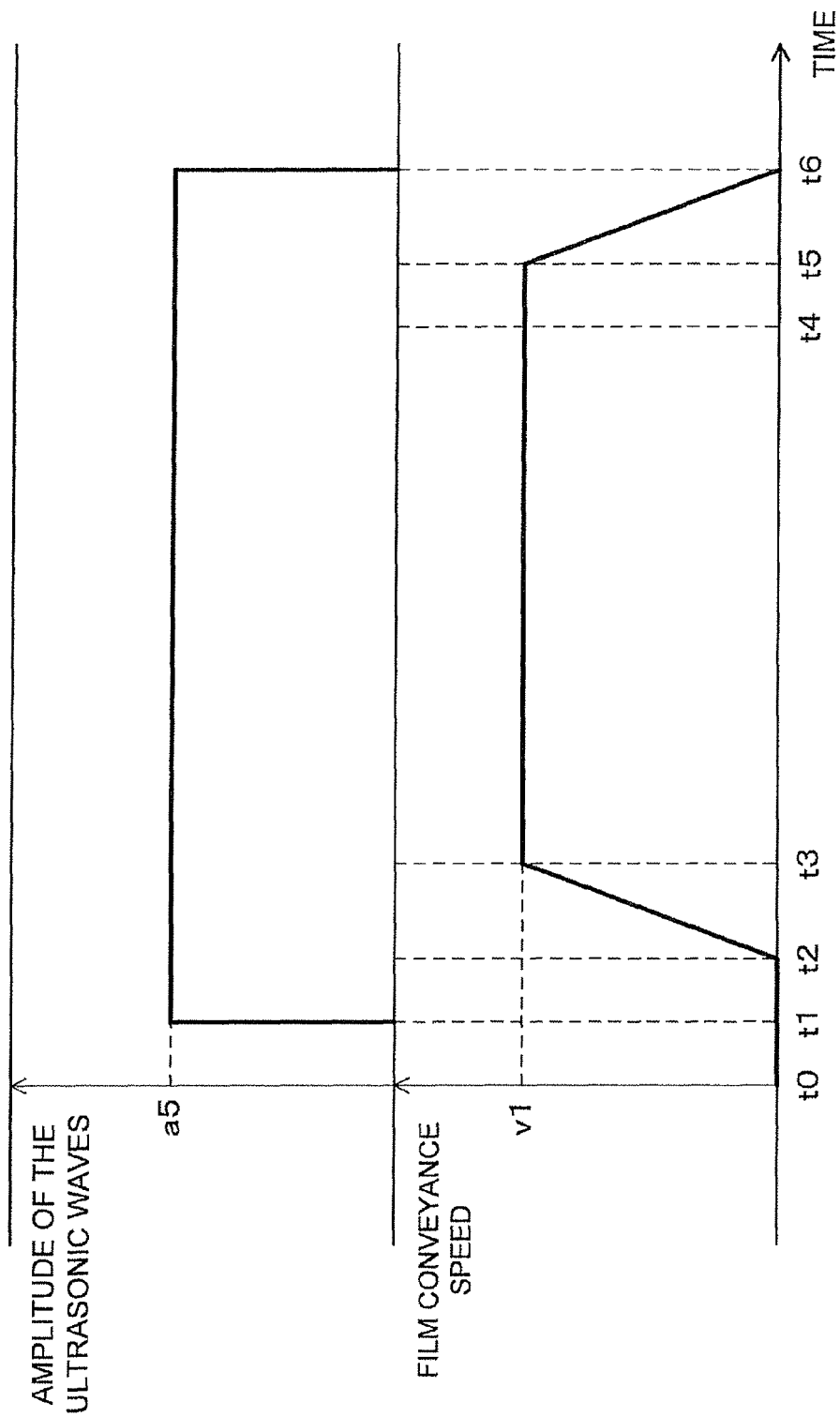
FIG. 7 is an ultrasonic oscillation amplitude time chart according to a modification example D of the present invention.

Also, in the present modification example, the controller 29 may perform a control so that ultrasonic oscillation having a constant amplitude a5 is applied to the cylindrical film Fm during the time period from time t1, which begins the preparatory time period t1 to t2 immediately before the cylindrical film Fm begins to be conveyed at time t2, to time t6, when the cylindrical film Fm stops being conveyed, as shown in FIG. 7. This is because, unlike in the case of the embodiment, the pressure applied to the cylindrical film Fm in the present modification example changes according to the conveyance speed of the cylindrical film Fm, eliminating the risk of more energy than necessary being applied to the cylindrical film Fm and the cylindrical film Fm melting excessively even if the amplitude of the ultrasonic oscillation applied to the cylindrical film Fm is controlled as shown in FIG. 7.

The invention claimed is:

1. A form-fill-seal machine, comprising:
   a conveyor configured to convey a film formed into a cylindrical shape by the form-fill-seal machine, the conveyor conveying the film at a conveyance speed;
   a sealing unit configured to apply pressure and ultrasonic oscillation to the film conveyed by the conveyor to create a seal between overlapping portions of the film; and
   a controller configured to control the conveyance speed, control the pressure applied by the sealing unit to the film, and control an amplitude of the ultrasonic oscillation applied to the film by the sealing unit;
   wherein:
   the controller is configured to control the conveyor and the sealing unit during each operation cycle such that the sealing unit is controlled to apply the ultrasonic oscillation to the film in a first time period immediately prior to a first point in time at which the conveyor begins to convey the film, the controller continuing to apply the ultrasonic oscillation with the film being conveyed after the first point in time, and the controller being further configured to change the amplitude of the ultrasonic oscillation applied to the film in a second time period after the first point in time while also changing the conveyance speed of the conveyor, the amplitude of the ultrasonic oscillation prior to the first time period being zero, and the amplitude of the ultrasonic oscillation during the first time period being at a level that enables the sealing unit to melt the film, the first time period being a preparatory time period in which ultrasonic oscillation energy is applied to the film in advance before the film begins to be conveyed.

2. The form-fill-seal machine according to claim 1, wherein:
   the controller being further configured to control the conveyor and the sealing unit so that the amplitude of the ultrasonic oscillation applied to the film is increased and the conveyance speed is increased in the second time period between the first point in time to a second point in time at which the conveyance speed becomes constant.

3. The form-fill-seal machine according to claim 2, wherein:
   the controller being further configured to control the conveyor and the sealing unit so that the amplitude of the ultrasonic oscillation applied to the film begins to decrease after the second point in time and immediately prior to a third point in time at which the conveyance speed begins to decrease.

4. The form-fill-seal machine according to claim 1, wherein:
   the sealing unit has a horn, an anvil, and a pressurizing unit for applying the pressure to the film via the horn and the anvil; and
   the controller being further configured to control the conveyor and the sealing unit so that the pressurizing unit applies the pressure to the film in a time period immediately prior to the first point.

* * * * *